(12) United States Patent
Singh et al.

(10) Patent No.: US 9,451,554 B1
(45) Date of Patent: Sep. 20, 2016

(54) SELECTIVE CONTROL OF UPLINK TRANSMISSION POWER BASED ON ROAMING STATUS

(71) Applicant: Sprint Spectrum L.P., Overland Park, KS (US)

(72) Inventors: Jasinder P. Singh, Olathe, KS (US); Eshwar Narava, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 52 days.

(21) Appl. No.: 14/608,295

(22) Filed: Jan. 29, 2015

(51) Int. Cl.
*H04B 7/00* (2006.01)
*H04W 52/14* (2009.01)
*H04W 72/00* (2009.01)
*H04W 8/02* (2009.01)
*H04L 5/14* (2006.01)

(52) U.S. Cl.
CPC ............. *H04W 52/146* (2013.01); *H04W 8/02* (2013.01); *H04W 72/005* (2013.01)

(58) Field of Classification Search
CPC  H04W 52/367; H04W 52/146; H04W 56/00
USPC .................. 455/522, 450, 509; 370/329, 318
See application file for complete search history.

(56) References Cited

U.S. PATENT DOCUMENTS 9,225,493 B2 * 12/2015 He ....................... H04L 5/0066
2011/0081936 A1 * 4/2011 Haim .................. H04W 52/367
455/522

* cited by examiner

*Primary Examiner* — Charles C Jiang
*Assistant Examiner* — Will Lin

(57) ABSTRACT

Disclosed is a method and system for allocating uplink air interface resources in a manner that allows particular user equipment devices (UEs) to apply less attenuation than may be specified more generally for UEs served by a base station of a wireless service provider. The base station may operate on a carrier band, serving UEs that are subscribers of the wireless service provider as well as UEs roaming in the base station's coverage area from another service provider. To avoid uplink transmission power leakage across the edges of the carrier band, the base station may broadcast a message to all the UEs notifying them to attenuate their respective transmission levels. The base station may allocate uplink air interface resources to subscribing UEs from a particular portion of the carrier band that allows them to transmit using less attenuation than roaming UEs and still avoid power leakage across the band edges.

20 Claims, 8 Drawing Sheets

SELECTIVE CONTROL OF UPLINK TRANSMISSION POWER BASED ON ROAMING STATUS

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of UEs, initiation of communications, handover of between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a UE is within coverage of a base station, the base station may from time to time transmit downlink control signaling to the UE. The purpose of such downlink control signaling may depend on the air interface protocol and the circumstances. By way of example, each coverage area may define a downlink control channel that may carry certain information such as control channel formatting information, a downlink reference signal that UEs may detect as an indication of coverage, system information, paging information, and the like, or may define various downlink control channels for carrying subsets of this information.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

OVERVIEW

A wireless cellular network, or more generally a wireless communication system may be operated by a wireless service provider, and multiple wireless service providers may coexist in a wireless marketplace, offering various services to subscribing customers, for example. Each wireless service provider may be licensed by a regulatory agency to operate in one or more distinct, non-overlapping regions, or "bands," of the radio frequency (RF) spectrum. For instance, in the United States, the Federal Communications Commission (FCC) holds regulatory authority over the RF spectrum for this purpose. Among the concerns and issues relating to operating in different regions of the RF spectrum is minimization and/or avoidance of RF emission "leaking" into one band due to transmissions originating from an adjacent or nearby band. A regulatory agency, such as the FCC, may set one or more requirements specifying allowable levels of power leakage, while not necessarily prescribing how to achieve the specified levels. And various design and engineering standards may be devised that specify procedures and protocols aimed (possibly among other purposes) at meeting such regulator mandates.

One approach to controlling cross-carrier power leakage is to implement an operational protocol by which a base station may signal to UEs in its coverage area an instruction or notification to attenuate their respective uplink transmission powers under circumstances in which a risk or likelihood of excessive cross-carrier power leakage may be unacceptable, for example. More particularly, a given wireless service provider may be able to ensure compliance of subscriber UEs with one or more power leakage mandates, such that signaling an instruction for attenuation is not necessary. However, the given service provider may also provide service to one or more other UEs that are subscribers of one or more different wireless service providers, for example pursuant to a service or roaming agreement with those different wireless service providers. It may also be the case that the given wireless service provider cannot verify that UEs that are subscribers of the different wireless service providers are similarly compliant with the one or more rules governing power leakage. As a consequence, when a base station of the given wireless service provider is providing roaming service to one or more of these other UEs, it may not be able to ensure that power leakage will not occur unless it can notify the other UEs to apply a certain amount of attenuation. Thus, the base station may then broadcast a signaling message to all UEs instructing them to apply attenuation.

While this approach can have the intended effect of avoiding or minimizing cross-carrier power leakage, the instruction to attenuate will broadcast to all the UEs, even the subscribing UEs that may already be compliant without having to attenuate. As a consequence, the subscribing UEs may be caused to unnecessarily attenuate their transmission power levels. It would therefore be desirable to be able to allow subscribing UEs to transmit without causing them to attenuate their power level, or at least not by a full amount, when attenuation is otherwise called for. Accordingly, disclosed herein is a method and system for allocating uplink air interface resources in a manner that allows particular UEs to apply less attenuation than may be specified more generally for UEs in a coverage area of a base station.

Hence, in one respect, various embodiments of the present invention provide a method operable in a base station of a wireless communication network of a first service provider, wherein the base station is configured for providing wireless services to user equipment devices (UEs) using air interface resources that span a wireless carrier band, the method comprising: the base station broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions; making a determination, by the base station, that the wireless communication network of the first service provider is a home network of a first subset of the UEs, and that a second subset of the UEs are roaming in the wireless communication network of the first service provider from a wireless communication network of at least one different service provider; and in response to at least the determination, the base station (i) allocating to the first subset of the UEs uplink air interface resources from a first portion of the wireless carrier band for which attenuation of uplink transmission power is specified by a first amount, and (ii) allocating to the second subset of the UEs uplink air interface resources from a second portion of the wireless carrier band for which attenuation of uplink transmission power is specified by a second amount, wherein the first amount is smaller than the second amount.

In another respect, various embodiments of the present invention provide a base station operable in a wireless communication network of a first service provider, wherein the base station is configured for providing wireless services to user equipment devices (UEs) using air interface resources that span a wireless carrier band, the base station comprising: a communicative link with at transceiver; one or more processors; and memory accessible to the one or more processors, and storing machine language instructions that, upon execution by the one or more processors, cause the base station to carry out operations including: broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions, making a determination that the wireless communication network of the first service provider is a home network of a first subset of the UEs, and that a second subset of the UEs are roaming in the wireless communication network of the first service provider from a wireless communication network of at least one different service provider, and in response to at least the determination, (i) allocating to the first subset of the UEs uplink air interface resources from a first portion of the wireless carrier band for which attenuation of uplink transmission power is specified by a first amount, and (ii) allocating to the second subset of the UEs uplink air interface resources from a second portion of the wireless carrier band for which attenuation of uplink transmission power is specified by a second amount, wherein the first amount is smaller than the second amount.

Further, in still another respect, various embodiments of the present invention provide a non-transitory computer readable medium having stored thereon instructions that, upon executing by one or more processors of a base station, cause the base station to carry out operations, wherein the base station is operable in a wireless communication network of a first service provider, and the base station is configured for providing wireless services to user equipment devices (UEs) using air interface resources that span a wireless carrier band, wherein the operations comprise: broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions; making a determination that the wireless communication network of the first service provider is a home network of a first subset of the UEs, and that a second subset of the UEs are roaming in the wireless communication network of the first service provider from a wireless communication network of at least one different service provider; and in response to at least the determination, (i) allocating to the first subset of the UEs uplink air interface resources from a first portion of the wireless carrier band for which attenuation of uplink transmission power is specified by a first amount, and (ii) allocating to the second subset of the UEs uplink air interface resources from a second portion of the wireless carrier band for which attenuation of uplink transmission power is specified by a second amount, wherein the first amount is smaller than the second amount.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
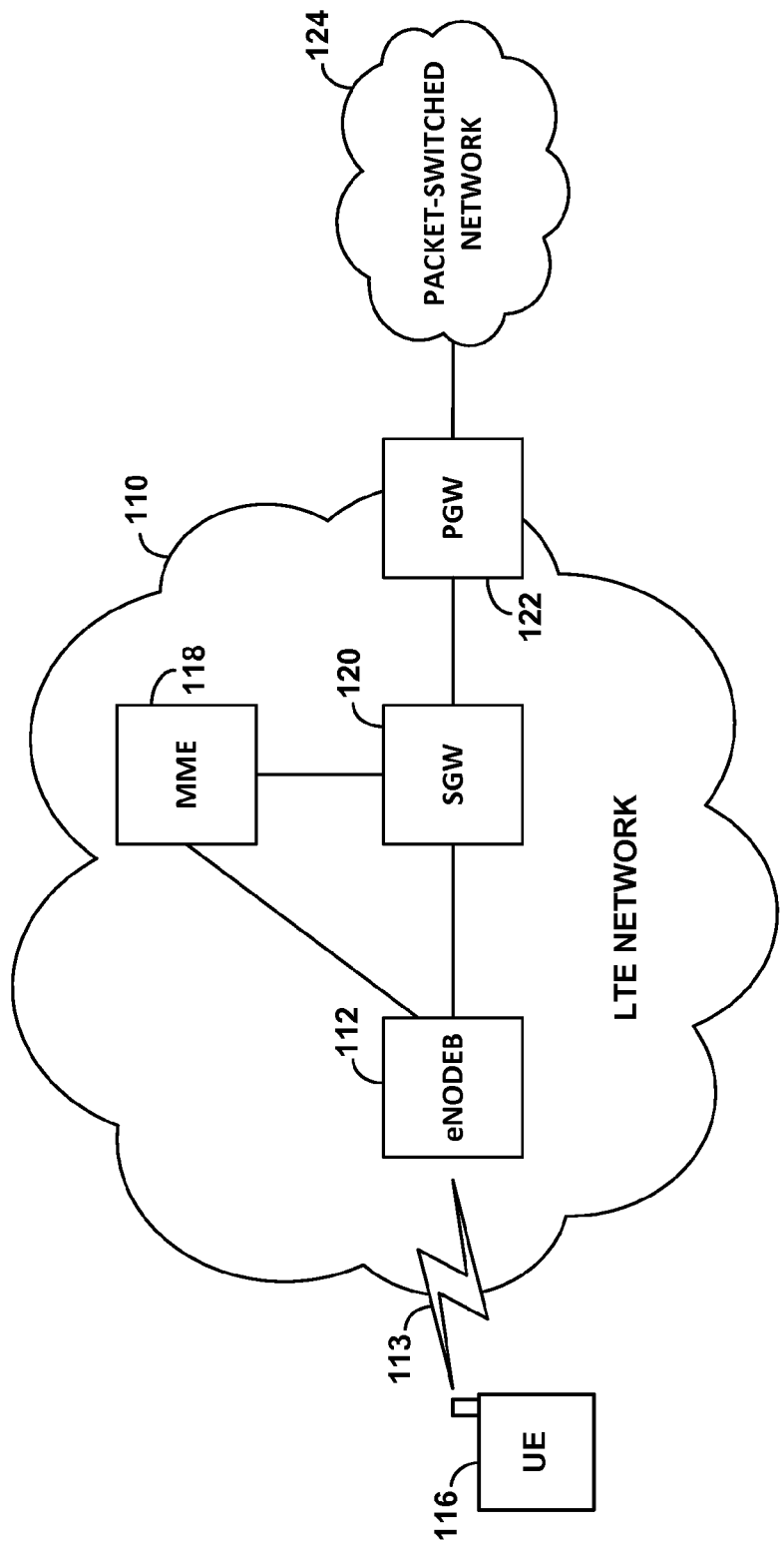
FIG. 1 is a simplified block diagram of a wireless communication system in which an example method can be implemented, in accordance with an example embodiment.

Referring to the drawings, FIG. 1 is a simplified block diagram of a wireless communication system in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. The eNodeB is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

In general, a wireless service provider may operate one or more RANs, such as the LTE RAN 110, as a "public land mobile network" ("PLMN") for serving UEs (or other mobile terminals) that subscribe to service of the provider. For example, a service provider may operate an LTE RAN as an LTE PLMN and may provide UEs with subscriptions that allow the terminals to receive LTE service from that PLMN. As another example, a service provider may operate a CDMA RAN as a CDMA PLMN and may provide UEs with subscriptions that allow the terminals to receive CDMA service from that PLMN. And as another example, a service provider may operate both an LTE PLMN and a CDMA PLMN and may provide UEs with subscriptions that allow the UEs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

A wireless service provider may also allow one or more of its PLMNs to serve UEs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve UEs that subscribe to the second PLMN, and the second wireless service provider will compensate the first service provider for providing that service. As such, a given UE that subscribes to service of the second PLMN but that is not within sufficient coverage of the second PLMN may instead opt to be served by the first PLMN, in which case the given UE is said to be "roaming" in the first PLMN. The second wireless service provider may also provide reciprocal roaming service to UEs that subscribe to service of the first PLMN.

Focusing again on LTE, each coverage area of a base station, such as the eNodeB 112, may operate on one or more RF carriers (or carrier bands) spanning 1.4 MHz, 3 MHz, 5 MHz, 10 MHz, 15 MHz, or 20 MHz of electromagnetic spectrum. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms subframes that are in turn each divided into two 0.5-ms slots. Thus, each frame has 10 subframes, and each subframe has 2 slots; the 1-ms duration of a subframe also defines a "transmission time interval" (TTI). Slots are each further sub-divided into a number (typically 7) of modulation intervals, or "symbol times." In the frequency domain, data for transmission during each symbol time are jointly modulated over a sequence of sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. Each sub-carrier is 15 kHz wide, so each group of 12 sub-carriers occupies a 180 kHz bandwidth.

LTE further defines a particular grouping of resources arrayed across one subframe (1 ms) in the time-domain and 12 sub-carriers in the frequency-domain as a "resource block." Typically, the 1-ms duration of a resource block contains 14 symbol times accommodating 14 OFDM symbols, each spanning 66.7 microseconds (μs) plus a 4.69 μs guard band (cyclic prefix) added to help avoid inter-symbol interference. Thus, each resource block contains 14 OFDM symbols by 12 sub-carriers, thereby constituting an array of 168 "resource elements." Depending on the bandwidth of the carrier, the air interface may support transmission on a number N of such resource blocks in each subframe. For instance, a 5 MHz carrier supports N=25 resource blocks in each 1-ms subframe, whereas a 20 MHz carrier supports N=100 resource blocks in each 1-ms subframe.

A resource element is to the smallest unit of resource allocated on the LTE air interface. Each resource element corresponds to one modulated data symbol on one sub-carrier during one symbol time. As noted, a resource block that consists of 12 sub-carriers and 14 OFDM symbols has 168 resource elements. Each modulated symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band corresponds to one OFDM symbol.

Within a resource block, different resource elements can serve different functions. For instance, on the downlink, certain resource elements across the bandwidth may be reserved to define a physical downlink control channel (PDCCH) for carrying control signals such as page messages and resource allocations from the eNodeB to UEs, and other resource elements may be reserved to define a physical downlink shared channel (PDSCH) that the eNodeB can allocate to carry transmissions to particular UEs on an as-needed basis. Likewise, on the uplink, certain resource elements across the bandwidth may be reserved to define a physical uplink control channel (PUCCH) for carrying control signals such as scheduling requests from UEs to the eNodeB, and other resource elements may be reserved to define a physical uplink shared channel (PUSCH) that the eNodeB can allocate to carry transmissions from particular UEs on an as-needed basis.

In practice, the PUCCH may define various periodically occurring "scheduling request opportunities" in which a UE, such as UE 116, may transmit scheduling requests to an eNodeB, such as the eNodeB 112. For instance, each scheduling request opportunity for the UE may be a particular resource element on the PUCCH, occurring every fourth transmission TTI (i.e., every 4 ms) or the like. Optimally, the eNodeB would signal to the UE to inform the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

Figure 2A:
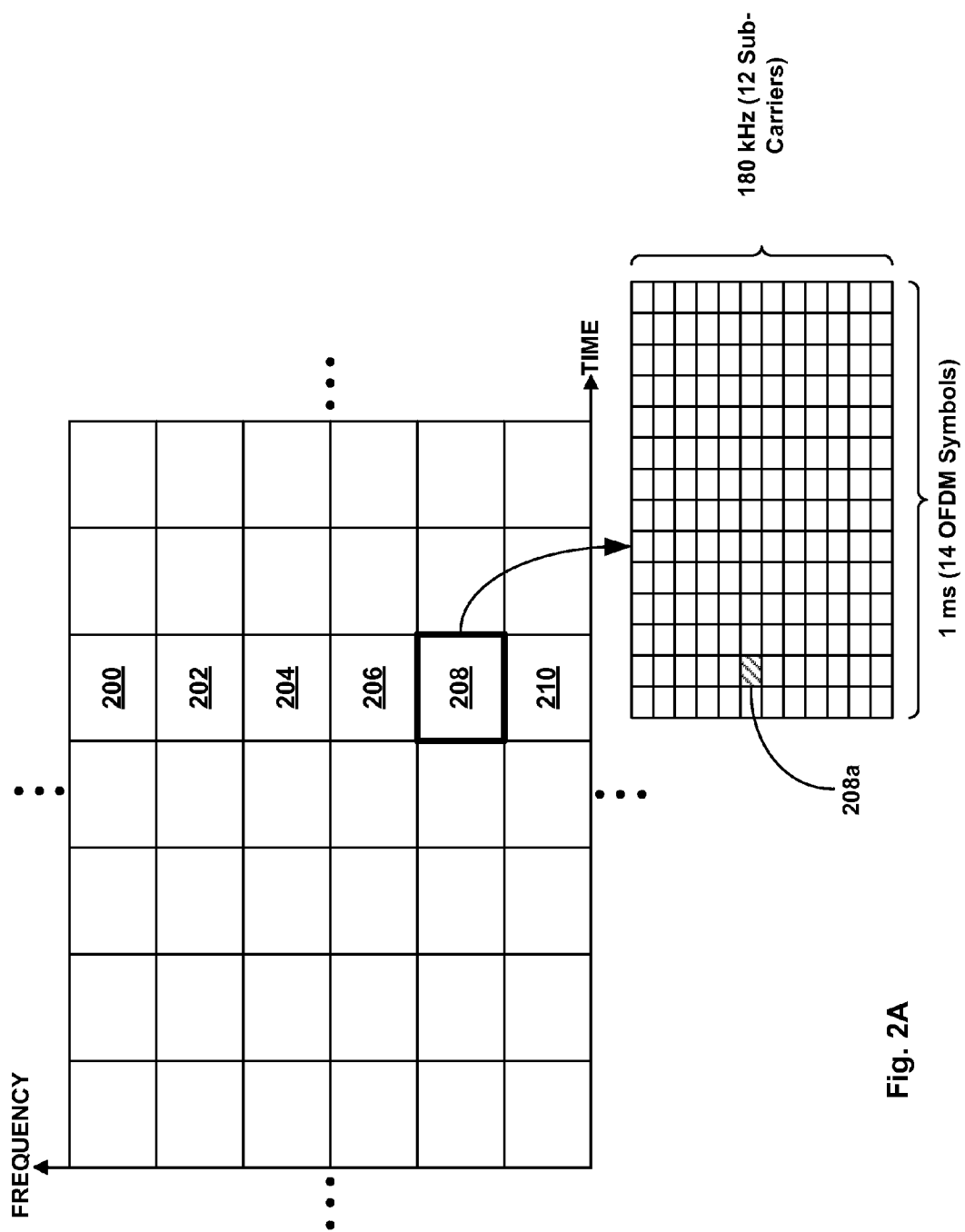
FIG. 2A is a conceptual illustration of a division of a shared communication link into resource blocks, in accordance with an example embodiment.

FIG. 2A illustrates how the resources in a given wireless coverage area may be divided in time and frequency domains into resource blocks under LTE. In the time domain, each resource block occupies a 1-ms subframe. By way of example, FIG. 2A shows resource blocks 200-210 for a portion of a subframe. In the frequency domain, each of the resource blocks 200-210 occupies a respective portion of frequency bandwidth, typically 180 kHz. For purposes of illustration, FIG. 2A shows resource blocks across just six subframes in time and six 12-sub-carrier groupings in frequency. However, as noted above, each LTE frame typically has 10 subframes, while the number of resource blocks spanning frequency depends on the bandwidth of the carrier. For instance, in a 5 MHz LTE carrier, a total of 25 resource blocks may span frequency during each 1 ms subframe. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms subframe corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Figure 2B:
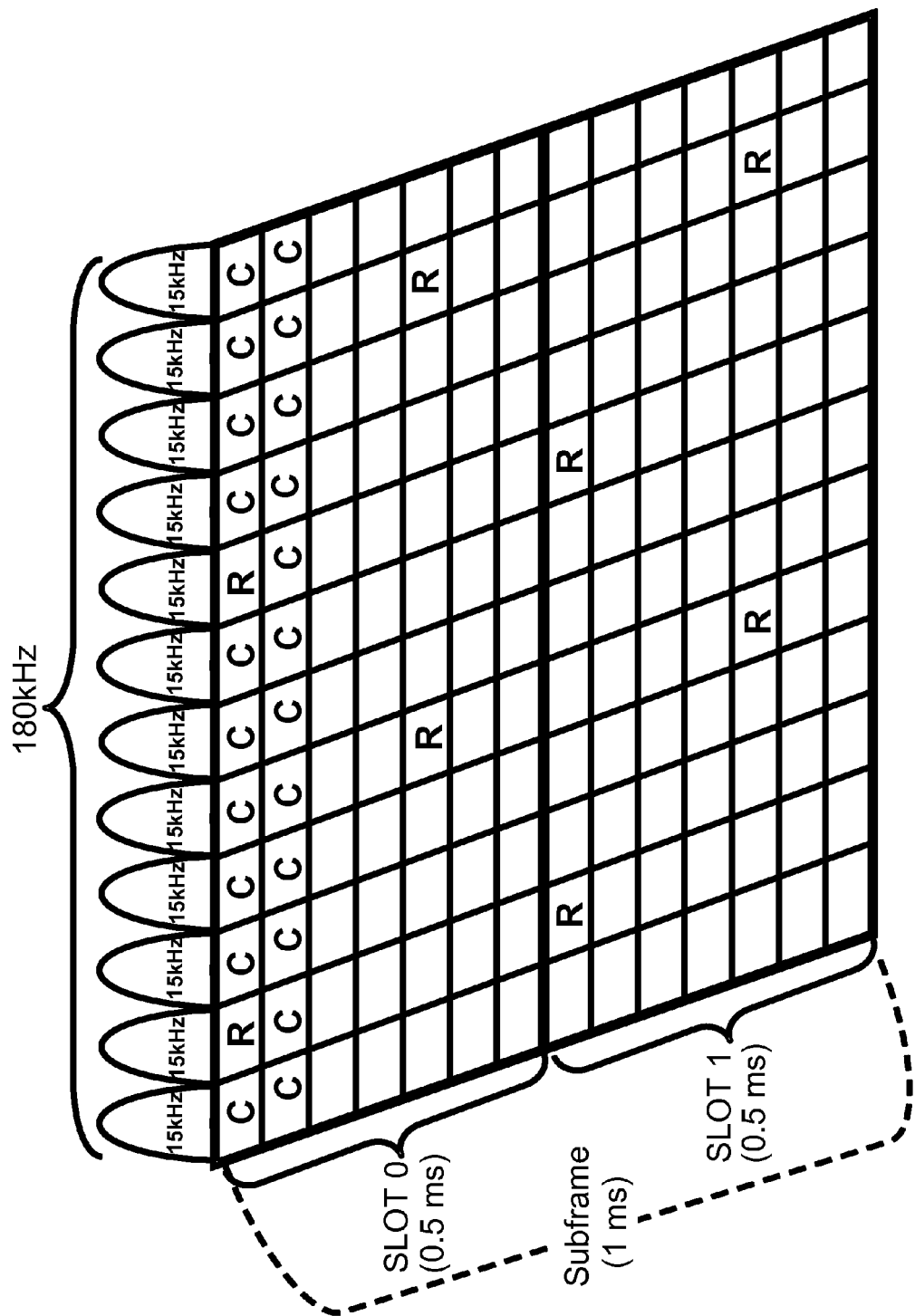
FIG. 2B is a conceptual illustration of a resource block, in accordance with an example embodiment.

The use of different resource elements for different purpose is illustrated by way of example for a downlink resource block in FIG. 2B. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a resource block could have other configurations as well.

In LTE as currently defined, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Within the electromagnetic spectrum, and the RF portion of the spectrum in particular, different wireless service providers may be allocated different, non-overlapping carrier bands for providing wireless services. Under LTE, carriers are allocated to service providers in different RF ranges and in non-overlapping bands of 1.4 MHz, 3 MHz, 5

MHz, 10 MHz, 15 MHz, and/or 20 MHz. Some service providers may have more than one carrier band allocation. Contiguous groupings of carriers can be further organized in frequency within different specified "band channels" used to sub-divide the RF spectrum at a higher level than individual carriers.

Any given carrier (or carrier band) can be characterized by a minimum frequency and a maximum frequency, such that the carrier bandwidth is just the difference between the maximum and minimum frequencies. The maximum and minimum frequencies can also be considered as defining band "edges." The carrier bandwidth is sub-divided into K sub-carriers, each 15 kHz wide, where N 12-sub-carrier groupings then make up N 180-kHz-wide resource blocks of the carrier. In practice, the total bandwidth of any given LTE carrier is somewhat wider than the N×180 kHz of its N resource blocks. For example, a 20 MHz carrier band has N=100 resource blocks for a total utilized bandwidth of 18 MHz out of the 20 MHz available. As another example, a 10 MHz carrier band has N=50 resource blocks for a total utilized bandwidth of 9 MHz out of the 10 MHz available. Under LTE, the unutilized bandwidth—i.e., bandwidth of sub-carriers that are not included in any of the N resource blocks—is configured in two guard bands, one at each band edge. That is, one guard band occupies spectrum between the first resource block and a first band edge, and the other guard band occupies spectrum between the last resource block and the second band edge.

Within a given band channel, carriers are arranged contiguously in frequency, such that any two adjacent carriers are separated by a common band edge. One consequence of this arrangement is that transmission power near the edge of one carrier can "leak" into the adjacent carrier across the common edge between the two carriers. Such power leakage can result in interference and correspondingly some degree of service degradation. The impact of power leakage across band edges can be mitigated to some extent by the guard bands at the band edges, which serve as buffers of nominally power-free spectrum. But power leakage can still be problematic depending, for example, on the transmission power level being used on the sub-carriers of the resource blocks—particularly those resource blocks nearest the band edges.

Figure 2C:
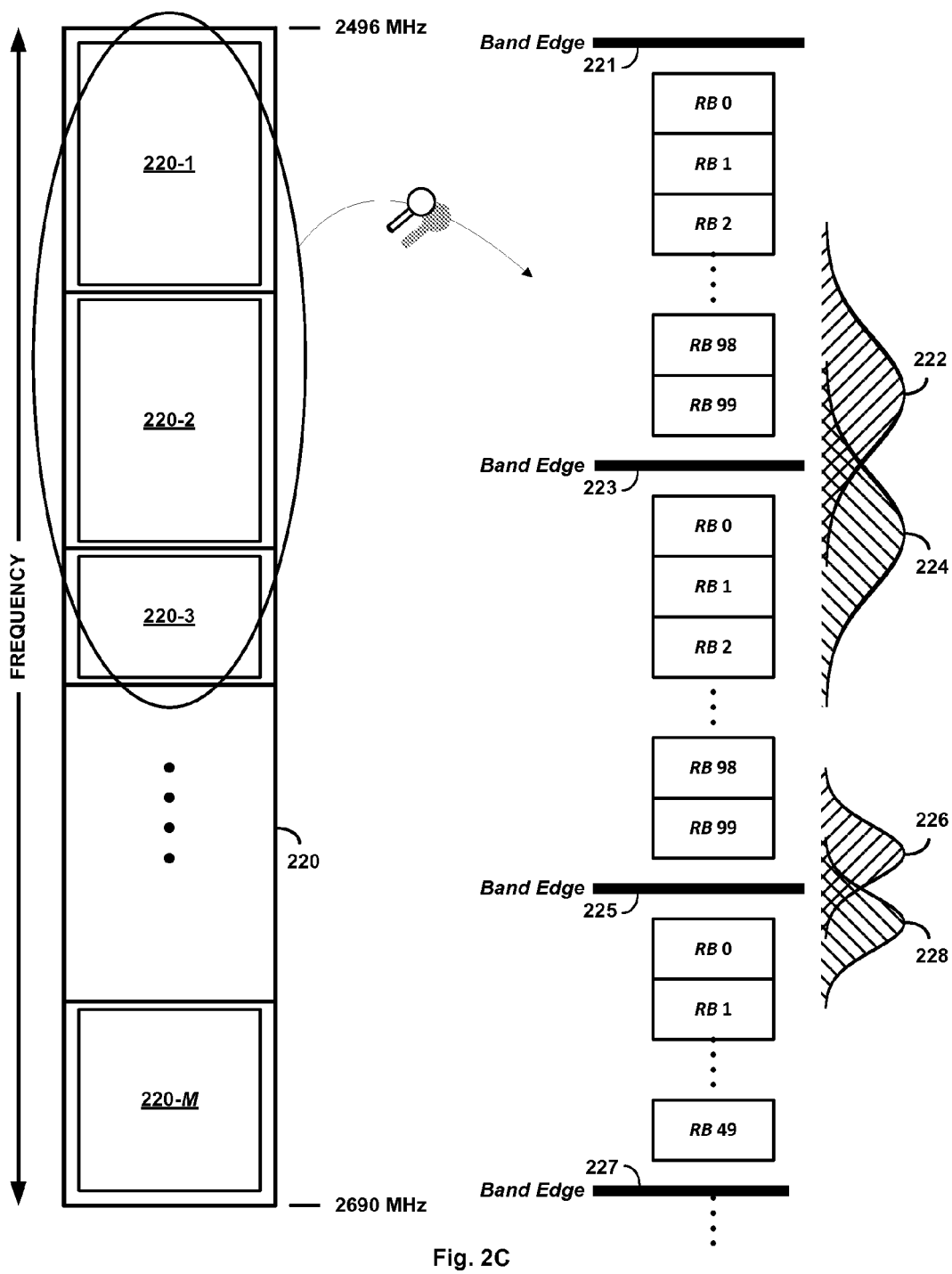
FIG. 2C is a conceptual illustration of wireless carrier bands of a band channel, in accordance with an example embodiment.

FIG. 2C is a conceptual illustration of wireless carrier bands of a band channel, band edges, and cross-carrier power leakage. The left side of FIG. 2C shows, by way of example, a band channel 220 spanning frequencies 2,496 MHz to 2,690 MHz, for a total of 194 MHz. Within the band channel 220, four representative carriers 220-1, 220-2, 220-3, and 220-M are shown. Vertical ellipses between carriers 220-3 and 220-M represent additional carriers not expressly shown in FIG. 2C. The right side of FIG. 2C shows an expanded view of the first three carriers 220-1, 220-2, and 220-3, depicting representative resource blocks in each carrier, as well as conceptually marking band edges. Specifically, a band edge 221 marks the minimum frequency of the carrier 220-1, which, by way of example, is also a lower-frequency boundary of the band channel 220. A band edge 223 marks a common boundary between the maximum frequency of the carrier 220-1 and the minimum frequency of the carrier 220-2. Similarly, a band edge 225 marks a common boundary between the maximum frequency of the carrier 220-2 and the minimum frequency of the carrier 220-3; and a band edge 227 marks a common boundary between the maximum frequency of the carrier 220-3 and the minimum frequency of the next (but unspecified) carrier (represented by vertical ellipses beneath the band edge 227).

Also by way of example in FIG. 2C, the carrier 220-1 has a bandwidth of 20 MHz, as signified by the 100 resource blocks numbered RB 0, RB 1, RB 2, . . . , RB 98, RB 99, where the ellipses represent 95 resource blocks between RB 2 and RB 98 that are not expressly shown for the sake of brevity in the figure. Similarly, the carrier 220-2 also has a bandwidth of 20 MHz, again as signified by the 100 resource blocks numbered RB 0, RB 1, RB 2, . . . , RB 98, RB 99. The carrier 220-3 has, by way of example, a bandwidth of 10 MHz, as signified by the 50 resource blocks numbered RB 0, RB 1 . . . , RB 49.

Power leakage between carriers is represented to the right of the displayed resource blocks by conceptual graphical plots of power as a function of frequency. In the example illustration, a power plot 222 represents transmission power originating in one or more sub-carriers of the carrier 220-1. Similarly, a power plot 224 represents transmission power originating in one or more sub-carriers of the carrier 220-2. As a visual cue, the two plots are shaded with oppositely-slanted hatch marks. Power leakage is represented by a region where the plots overlap, depicted with slanted cross-hatching in the figure. It should be understood that the form of the illustration in FIG. 2C is conceptual, and that any apparent symmetry of cross-carrier leakage is not necessarily intended to imply or suggest such symmetry in practice.

A similar conceptual representation of power leakage is illustrated with partially overlapping power plots 226 and 228 near the band edge 225 between the carriers 220-2 and 220-3. Namely, in the overlap region of the power plots 226 and 228, at least some of the power in the carrier 220-2 near the band edge 225 originates from sub-carriers in the carrier 220-3; and in the overlap region, at least some of the power in the carrier 220-3 near the band edge 225 originates from sub-carriers in the carrier 220-2.

In the context of RF spectrum management, power leakage from one defined band to another is sometimes referred to as "out of band emission," or "OOBE," and one metric applied to leakage across channel boundaries is an "adjacent channel leakage ratio," or "ACLR." In principle, power leakage across carrier band edges can occur on both the downlink and the uplink, and one or more conventional techniques may be implemented in a wireless communication system to help control or reduce leakage and/or its effects. For example, a wireless service provider may manage power leakage issues on the downlink by deployment planning of eNodeBs, as well as implementing inter-base-station communications aimed at controlling and/or minimizing interference. On the uplink, UEs may be configured to modify or adapt their respective transmission powers in response to one or more control messages to do so from a serving eNodeB. In addition to operational procedures specified by one or another standard, OOBE and/or ACLR may also be subject to regulatory control. For instance, in the United States, the Federal Communications Commission (FCC) dictates OOBE levels that must not be exceeded, without the FCC necessarily prescribing how to achieve compliance.

Under LTE, one approach to controlling OOBE and ACLR on the uplink is to cause UEs in the coverage area of an eNodeB to reduce their respective transmission powers in accordance with one or more directives from the eNodeB. More particularly, LTE defines a "maximum power reduction" ("MPR") value that prescribes one or more default power levels that a UE may use in transmission. In order to meet additional ACLR and regulatory spectrum emission requirements, LTE also defines "additional maximum power reduction" ("A-MPR") values that UEs may be directed to apply in order to further reduce transmission power when necessary. Typically, A-MPR values specify a power attenuation value in logarithmic units of decibels (dB) relative to their current level, where any two power levels $P_0$ and $P_1$ are related by x dB=10 $\log_{10}(P_1/P_0)$. For example, attenuation by 3 dB corresponds to power reduction by ½ (i.e., reduction by a factor of two). An eNodeB may broadcast one of two "network signaling" ("NS") values to UEs in its coverage area to indicate whether the UEs should use the default MPR or apply the A-MPR. The NS values can thus serve to define OOBE levels that UEs must meet, and to define A-MPR values to apply in order to meet the required OOBE levels.

By way of example, LTE defines "NS_01" to signify default MPR for all bands and bandwidths, and defines "NS_04" to signify specific attenuation values of A-MPR for the band channel 220 spanning frequencies 2,496 MHz to 2,690 MHz illustrated in FIG. 2C. As described in more detail below, the actual amount of attenuation applied (in dB) by a UE that receives NS_04 is determined by the UE based on which uplink air interface resources the UE has been allocated for upcoming transmissions to the eNodeB. Values other than NS_04 for signifying A-MPR may apply to other band channels. Thus, the principles of operation described herein are not limited to just the 2,496 MHz to 2,690 MHz band channel, but can be applied to specifying A-MPR in any band channel or other spectral range.

While use of an A-MPR can help cause UEs to meet OOBE levels, reduced uplink transmission power can also reduce the effective size of an eNodeB's coverage area. Under certain operational circumstances, a given wireless service provider may be able to cause UEs to operate within mandated OOBE levels without needing to resort to A-MPR. For example, the given wireless service provider may retain a degree of configuration control over UEs of users who are subscribers to services in the wireless service provider's network. More particularly, the given wireless service provider may specify capabilities and configurations of UEs that manufacturers and/or suppliers must provide in order for their UEs to be certified for operation as subscriber devices in the given wireless service provider's network. In accordance with example embodiments, one such capability can be a requirement that UEs meet mandated OOBE levels using just the default MPR, without having to apply A-MPR for additional attenuation. Thus, while MPR levels specified by default NS values may not in general meet mandated OOBE levels, subscriber UEs of the given wireless service provider may in fact meet the OOBE and ACLR requirements while applying only default power reduction—i.e., with 0 dB A-MPR—by virtue of manufacturers' compliance with particular requirements of the given wireless service provider.

However, even when subscriber UEs of a given wireless service provider can achieve required OOBE and ACLR levels using just the default MPR (or some other unattenuated specified power level), it may not always be possible to ensure that all UEs operating within a coverage area of an eNodeB of the given wireless service provider can do so. For example, different wireless service providers may have service level agreements (or other types of roaming agreements) with one another that allow subscribers of one service provider to receive wireless service while roaming in the network of another service provider. Under this circumstance, UEs roaming in a "host" wireless network from one or more "foreign" wireless networks may not necessarily comply with OOBE and ACLR configurations of subscriber UEs of the host network. And the host network may not be able to determine that this is the case.

In order to address this situation and/or protect against UEs that, without applying additional attenuation to their uplink transmission power levels, are not compliant with OOBE levels, LTE specifies that an eNodeB of a wireless service provider should broadcast a NS level that does meet OOBE requirements (e.g., NS_04) when roaming UEs (or other operational circumstances) introduce risk of excessive OOBE within the coverage area of the eNodeB. As a consequence of the broadcast, all UEs in the coverage area will be instructed to apply A-MPR (or some other additional amount of attenuation)—even those that are subscriber UEs that already meet OOBE requirements without the additional attenuation. Under this circumstance, subscriber UEs—i.e., those for which the wireless service provider is the "home" network—are caused to unnecessarily reduce their uplink transmission power. It would therefore be desirable for such subscriber UEs to be able to continue to operate without having to reduce their uplink transmission power levels—at least not by the full amount specified by the A-MPR (or by some other amount defined for controlling OOBE and/or ACLR).

In accordance with example embodiments, an eNodeB can apply a selective scheduling and allocation technique to allocate air interface resources on the uplink for specific UEs operating in the eNodeB's coverage area, such that the specific UEs can apply less attenuation while still meeting OOBE and ACLR requirements. More specifically, the scheduling and allocation technique takes account of the different portions of a wireless carrier that may be used for allocation of air interface resources, and seeks to allocate those portions with the lowest tendency for cross-carrier power leakage to subscriber UEs. By doing so, the eNodeB enables the subscriber UEs to transmit without applying a full amount of attenuation that might be necessary for other, non-subscriber, UEs in the eNodeB's coverage area.

Figure 3:
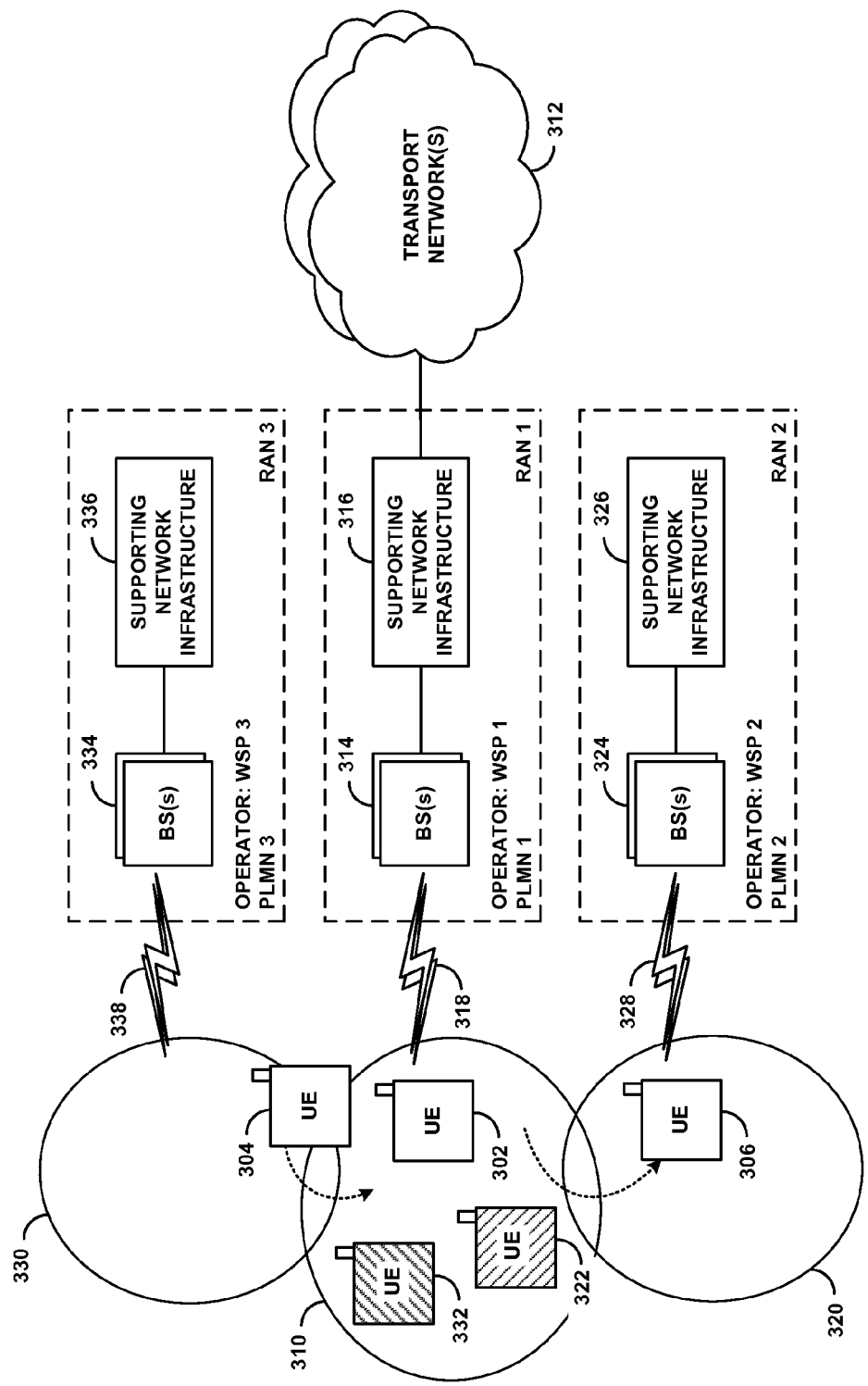
FIG. 3 is a simplified block diagram of wireless communication systems of multiple wireless service providers in which an example method can be implemented, in accordance with an example embodiment.

In order to help provide an operational context for example embodiments, it is useful to briefly review certain aspects of roaming between wireless communication systems of different wireless service providers. FIG. 3 is a simplified block diagram of wireless communication systems of multiple wireless service providers in which roaming can occur, and thereby possibly give rise to a need for a service provider to take preventative action against possible OOBE and/or ACLR in one or more of its coverage areas. The illustrated system includes three representative RANs, designated RAN 1, RAN 2, and RAN 3. Each of these RANs includes one or more base stations interconnected with supporting network infrastructure that provides connectivity with one or more transport networks 312, such as the PSTN and the Internet, with each base station radiating to define at least one coverage area such as a cell sector for instance. In particular, RAN 1 includes one or more base stations 314 interconnected with supporting infrastructure 316 and radiating to define one or more coverage areas 310 within which communications with UEs may be carried on an air interface 318. Similarly, RAN 2 includes one or more base stations 324 interconnected with supporting infrastructure 326 and radiating to define one or more coverage areas 320 within which communications with UEs may be carried on an air interface 328; and RAN 3 includes one or more base stations 334 interconnected with supporting infrastructure 336 and radiating to define one or more coverage areas 330 within which communications with UEs may be carried on an air interface 338. For the sake of brevity in the figure, only the RAN 1 is depicted as connected with transport network(s) 312; however, RAN 2 and RAN 3 may be similarly connected to respective transport networks.

In the example system as shown, each of the illustrated RANs is operated by a respective wireless service provider (WSP). In particular, RAN 1 is operated by WSP 1, RAN 2 is operated by WSP 2, and RAN 3 is operated by WSP 3. Each of these WSPs may be a separate company, or various WSPs may be co-owned and perhaps branded differently. For instance, a given WSP may hold itself out as providing service under the brand name "WSP 1," whereas another WSP may hold itself out as providing service under the brand name "WSP 2." Or a single company may hold itself out as providing service under the name "WSP 1" and separately under the name "WSP 2."

Further, each WSP may be licensed to operate a respective PLMN for providing communication service to UEs, and the WSP may operate its RAN as at least part of its PLMN and further have roaming agreements with other WSPs. In particular, WSP 1 may be licensed to operate PLMN 1 having PLMN ID 1, WSP 2 may be licensed to operate PLMN 2 having PLMN ID 2, and WSP 3 may be licensed to operate PLMN 3 having PLMN ID 3.

As shown by way of example, WSP 1 thus operates RAN 1 as PLMN 1, so the base stations of RAN 1 may broadcast PLMN ID 1 to indicate that they are part of PLMN 1. WSP 2 operates RAN 2 as part of PLMN 2, and so the base stations of RAN 2 may broadcast PLMN ID 2 to indicate that they are part of PLMN 2. And WSP 3 operates RAN 3 as PLMN 3, so the base stations of RAN 3 may broadcast PLMN ID 3 to indicate that they are part of PLMN 3.

FIG. 3 also depicts example UEs that subscribe to services in one or another of the WSPs. For purposes of illustration and by way of example, the UEs 302, 304, and 306 are subscribers in WSP1; UE 322 is a subscriber in WSP2, and UE 332 is a subscriber in WSP 3. Thus, WSP 1 is the home network of UEs 302, 304, and 306. Similarly, WSP 2 is the home network of UE 322, and WSP 3 is the home network of UE 332. As a visual cue to the different subscription arrangements, UEs 302, 304, and 306 are shown in white, while the UEs 322 and 332 are shaded with (oppositely directed) hatch marks.

UE 302 is depicted as currently being served in the coverage area 310 of RAN 1 of WSP 1. Since UE 302 is a subscriber in WSP 1, UE 302 is not roaming. Each of UEs 322 and 332 are also depicted as currently being served in the coverage area 310 of RAN 1 of WSP 1. Thus, WSP 1 is acting as a host network for UEs 322 and 332, and they are both roaming in WSP 1. As also illustrated, UE 304 is evidently near a boundary between the coverage area 330 of WSP 3 and the coverage area 30 of WSP 1, but, as signified by a curved arrow pointing toward the coverage area 310, UE 304 is "facing" its home network (WSP 1). This could correspond to UE 304 being in the process of reacquiring service in WSP 1 after having roamed into WSP 3, for example. Or UE 304 could have approached but returned from threshold of roaming to WSP 3. As a further illustration, UE 306 is depicted as currently being served in the coverage area 320 of RAN 2 of WSP 2. Thus, UE 306 is roaming in WSP 2 from its home network WSP 1; this is signified by a curved arrow pointing from the coverage area 310 to UE 306 in the coverage area 320. The particular service/roaming scenarios depicted by way of example in FIG. 3 are not intended to be exhaustive, but rather just to illustrate a few possible operational circumstances.

A UE may be provisioned with data that specifies one or more PLMNs to which the UE subscribes. For instance, the UE may have data storage that holds the PLMN ID of each PLMN to which the UE subscribes. Further, the UE may be provisioned with program logic that causes the UE to prefer operation in coverage areas having a PLMN to which the UE subscribes.

In practice, the air interface of each coverage area in the example communication system may define a downlink for carrying communications from the serving base station to served UEs, and an uplink for carrying communications from served UEs to the serving base station. Depending on the radio access technology, these air interface links may take various forms and may define various channels for carrying particular data, such as control data and bearer traffic for instance. For example, the air interface for an LTE system maps air interface resources to resource blocks and/or particular resource elements of resource blocks, as described above.

By way of example, each coverage area may define a pilot channel or reference channel on which the base station may broadcast a pilot signal or reference signal that UEs may detect as an indication of coverage and may measure to determine coverage strength. Further, each coverage area may define a control channel that carries various overhead messages, such as system information blocks or the like, specifying characteristics and operational parameters of the coverage area, such as one or more PLMN IDs of the coverage area for instance. Each coverage area may also have a respective coverage area identifier, such as a Physical Cell Identity (PCI) for instance, which could be indicated by the pilot or reference signal or specified in another overhead broadcast message or signal.

When a UE first powers on or enters into coverage of the network, the UE may scan for pilot or reference signals and determine for each detected signal a signal level (e.g., receive strength or signal-to-noise ratio) and corresponding coverage area identifier (e.g., PCI). The UE may thereby identify a coverage area providing the strongest pilot or reference signal, possibly giving priority to coverage areas having a PLMN to which the UE subscribes, and may register or attach with the network by transmitting a registration request or attach request to the base station providing that signal.

In the registration or attach request, or in some other manner, the UE may convey to the base station an indication of a PLMN to which the UE subscribes, to enable the base station or supporting infrastructure to determine whether to serve the UE. With this data, for example, the base station may determine that the coverage area at issue has a PLMN corresponding to a PLMN to which the UE subscribes (e.g., has that very PLMN). Or as another example, the base station may determine that the coverage area at issue has does not have a PLMN corresponding with a PLMN to which the UE subscribes but has a PLMN that has roaming relationship with a PLMN to which the UE subscribes and may agree to serve the UE on that basis.

At the time of registration/attachment or thereafter, the UE may also engage in signaling with the base station to enter into a connected or "active" mode, in which the base station has assigned to the UE a radio link connection over which the UE can engage in bearer communication with the base station and thereby with various other entities. In that mode, for instance, the UE may engage in packet data communications on the Internet and/or a voice call on the PSTN.

In conventional operation under LTE, an eNodeB that allows or supports roaming of non-subscribing UEs, such the example base station 314 in FIG. 3, may broadcast a message, such as a NS value, that signals UEs in its coverage area to apply additional attenuation to their respective uplink transmission power levels. As described above, the base station may issue the broadcast in response to serving a threshold number of roaming UEs, or possibly just in response to allowing or enabling inbound roaming at all. The UEs may then respond by determining an amount by which each should reduce (attenuate) its transmission power level.

More particularly, under LTE, when a particular UE has data to transmit, it first requests uplink air interface resources from its serving eNodeB. After receiving the request and processing it in the context of requests from other UEs as well as scheduling of downlink data transmissions, the eNodeB determines one or more uplink air interface resources to allocate to the particular UE to accommodate its request. The eNodeB allocates uplink air interface resources for use by the particular UE during an upcoming transmission interval, and informs the particular UE of the allocated resources in a control message. For example, as described above, a UE may transmit a scheduling request on the PUCCH, and the eNodeB may in turn transmit scheduling information on the DCI of the PDCCH to inform the UE of particular resource blocks of the PUSCH that have been allocated to the UE. Having previously received a signal to increase attenuation of its uplink transmission power level, the UE will determine a prescribed amount of attenuation based on the uplink air interface resources it has been allocated.

In accordance to LTE procedures, the eNodeB will allocate one or more specific uplink resource blocks to the requesting UE for its upcoming transmission to the eNodeB. Resource blocks are identified according to running sequence numbers that correspond to their respective position in the sequence of resource blocks that cover the carrier band used by the eNodeB. For example, resource blocks in a 20 MHz carrier band may be numbered 0, 1, . . . , 99. The UE can maintain a table (or other form of storage) that tabulates attenuation values (e.g., in dB) against resource block sequence number (or ranges of numbers), and can consult the table to determine the appropriate attenuation value for its allocated resource blocks. When the UE subsequently transmits its data using the allocated uplink resource blocks, it will also, according to conventional operation, apply the additional attenuation as determined from the table.

A rationale for associating attenuation values with resource block sequence numbers derives from the correspondence between the resource block sequence number and the resource block's position in the carrier band, and in particular its distance in frequency from the band edges. More specifically, resource blocks near the beginning and end of the sequence are closer to the band edges than those near the middle of the sequence. Thus, for a given uplink power level, transmissions using resource blocks near the band edges are more likely to leak power into adjacent bands than transmission using resource blocks near the middle of the carrier band. The FCC therefore specifies larger attenuation values for resource block allocated near the band edges than for those allocated near the middle of the carrier band.

Taking again the example of the band channel from 2,496 MHz to 2,690 MHz, for which NS_04 specifies that A-MPR be used, two different attenuation values are defined for three different portions, or regions, of any carrier band in the band channel. The three regions are designated "Region A," "Region B," and "Region C." For any 10 MHz carrier band in the band channel, Region A covers a contiguous resource block allocation beginning with resource blocks 0-12, and specifies an A-MPR value of 3 dB; Region B covers a contiguous resource block allocation beginning with resource blocks 13-36, and specifies an A-MPR value of 2 dB; and Region C covers a contiguous resource block allocation beginning with resource blocks 37-49, and specifies an A-MPR value of 3 dB.

For any 15 MHz carrier band in the band channel, Region A covers a contiguous resource block allocation beginning with resource blocks 0-18, and specifies an A-MPR value of 3 dB; Region B covers a contiguous resource block allocation beginning with resource blocks 19-55, and specifies an A-MPR value of 2 dB; and Region C covers a contiguous resource block allocation beginning with resource blocks 56-75, and specifies an A-MPR value of 3 dB. And for any 20 MHz carrier band in the band channel, Region A covers a contiguous resource block allocation beginning with resource blocks 0-24, and specifies an A-MPR value of 3 dB; Region B covers a contiguous resource block allocation beginning with resource blocks 25-74, and specifies an A-MPR value of 2 dB; and Region C covers a contiguous resource block allocation beginning with resource blocks 75-99, and specifies an A-MPR value of 3 dB. Thus, as noted, resource blocks near the band edge call for more attenuation than those near middle of the carrier band. Specifically, Regions A and C call for a factor of two power reduction, while Region B calls for about a factor of 1.6, or about 20% less. Note that analogous region specifications and attenuation values can be set for different band channels.

In accordance with example embodiments, an eNodeB that has broadcast a signal, such as NS_04, to UEs in its coverage area instructing them to apply additional attenuation can determine which of the UEs are subscribers of the eNodeB's network and which are roaming. When accommodating a request from any of the UEs for uplink air interface resources, the eNodeB can then allocate the subscribing UEs uplink air interface resources from a portion of the eNodeB's carrier band that specifies the least additional attenuation. At the same time, the eNodeB can allocate the roaming UEs uplink air interface resources from a portion of the eNodeB's carrier band that specifies the greatest additional attenuation. In this way, UEs that have previously received an eNodeB broadcast a signal to apply additional attenuation, and that determine the amount of additional attenuation based on uplink air interface resources respectively allocated them by the eNodeB, can be caused to select an amount of attenuation based on the eNodeB's determination of whether they are subscribing UEs or are roaming in the eNodeB's network. In particular, subscribing UEs can maintain a higher level of uplink transmission power than the roaming UEs. Since the subscribing UEs may already meet OOBE and ACLR requirements without any additional attenuation, enabling them to apply a lower level of attenuation will not in any case impact their compliance with mandated emission levels.

More specifically under LTE, the eNodeB can allocate resource blocks near the middle of its carrier band to subscriber UEs and allocate resource blocks near the edges of its carrier band to roaming UEs. For the example of the band channel from 2,496 MHz to 2,690 MHz, the eNodeB can allocate resource blocks in Region B to subscriber UEs and allocate resource blocks in Regions A and C to roaming UEs. Subscribing UEs will thereby be able to use at least 20% more power on their respective uplink transmissions than roaming UEs. It will be appreciated that the example technique could be adapted and/or applied to other values of attenuation and ranges of resource blocks.

In accordance with example embodiments, the eNodeB can determine which UEs are subscribers and which are roaming based on the PLMN of the UEs it is serving in its coverage area. For example, when a UE makes a registration or attach request with the eNodeB, it may include an indication of the PLMN to which the UE subscribes, as described above. If the eNodeB operates in the same PLMN, then it will identify the UE as a subscriber. If, instead, the PLMN to which the UE subscribes is not one that the eNodeB operates in, but is one that has a roaming agreement with the PLMN of the eNodeB, then the eNodeB can serve the UE as a roaming UE. By this or some similar procedure, the eNodeB can thus identify which of the UEs it is serving are subscribers and which are roaming.

The eNodeB can then allocate uplink air interface resources to the UEs based on roaming status of the UEs. Namely, subscribing UEs (not roaming) can be allocated resource blocks that allow the UE to apply the least amount of additional attenuation, while roaming UEs (those from subscribing to other wireless service providers and/or PLMNs) can be allocated resource blocks for which higher attenuation is required. In an LTE system or under an air interface protocol that at least partially governs uplink power attenuation similarly based on allocated uplink air interface resources, subscriber UEs in a coverage area of an eNodeB may thereby be enabled to use more transmission power than roaming UEs in the coverage area. As such, the subscriber UEs may also "see" a larger effective coverage area of the eNodeB than the roaming UEs.

Figure 4:
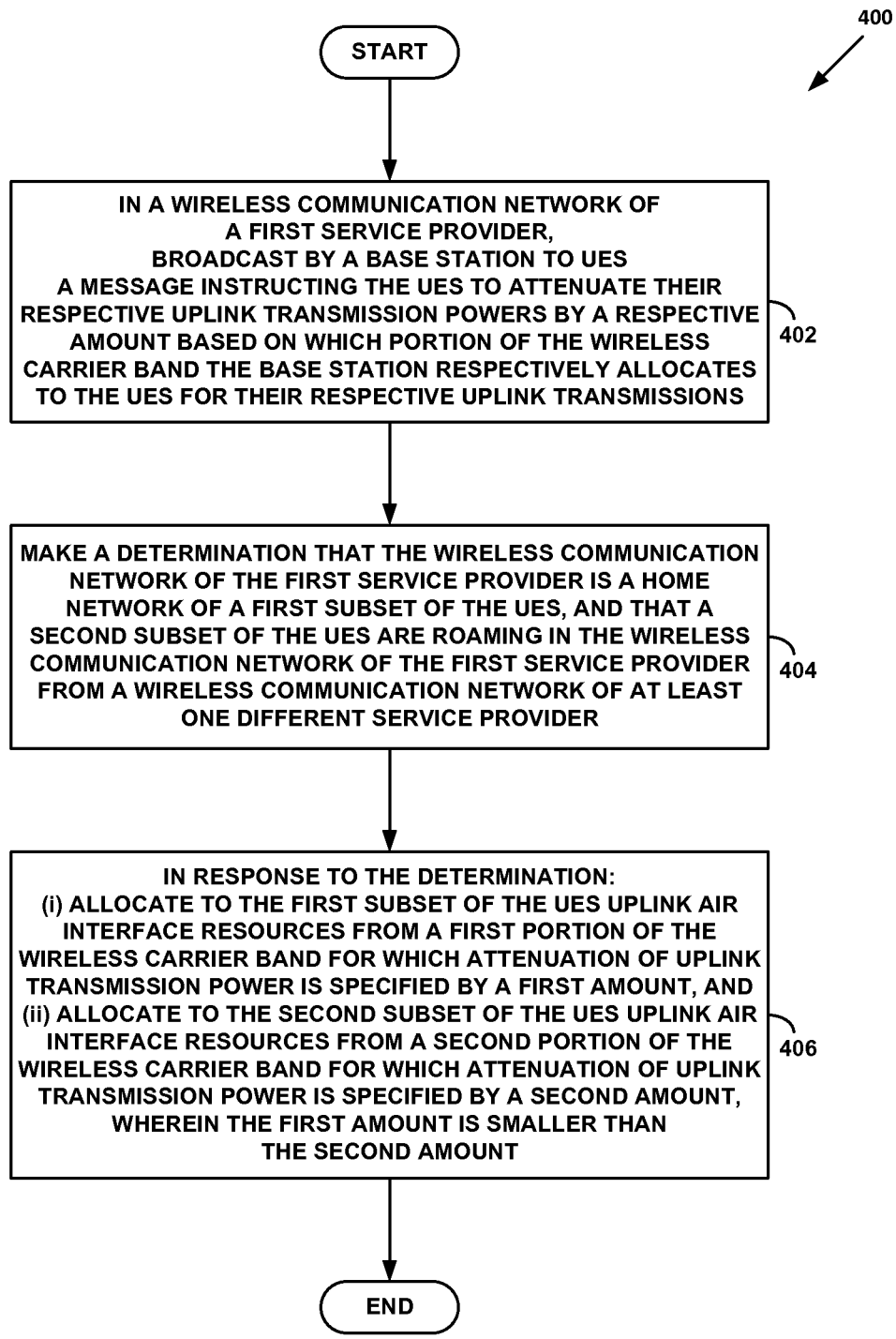
FIG. 4 is a flowchart illustrating an example method for selective control of uplink transmission power based on roaming status, in accordance with an example embodiment.

FIG. 4 is a flowchart illustrating a method 400, according to an example embodiment. Illustrative methods, such as method 400, may be carried out in whole or in part by a base station or other component in a wireless communication system, such as by the eNodeB 112 of the representative LTE RAN 100 shown in FIG. 1, using one or more of the air interface arrangements shown in FIGS. 2A-2B. The base station 314 in FIG. 3 is also an example of a network device or component that could be configured to carry out the example method 400. However, it should be understood that example methods, such as method 400, may be carried out by other entities or combinations of entities as well as in other arrangements, without departing from the scope of the invention. By way of example, the method 400 can be implemented as machine language instructions that can be stored on non-transient machine-readable media (e.g, solid state memory, magnetic disk, etc), and that when executed by one or more processors of a base station to cause the base station to carry out operations, steps, and/or functions of the method.

Method 400 may be operable in a base station of a wireless communication network of a first service provider. In particular, the base station may be configured for providing wireless services to user equipment devices (UEs) using air interface resources that span a wireless carrier band.

As shown by block 402 in FIG. 4, method 400 involves the base station broadcasting to UEs in a coverage area of the base station a message instructing the UEs to attenuate their respective uplink transmission powers by a respective amount. Each respective UE determines the respective amount of attenuation to apply based on which of multiple portions of the wireless carrier band is allocated, at least in part, to the respective UE by the base station for uplink transmissions.

As shown by block 404 in FIG. 4, method 400 next involves the base station making a determination that the wireless communication network of the first service provider is a home network of a first subset of the UEs, and that a second subset of the UEs are roaming in the wireless communication network of the first service provider from a wireless communication network of at least one different service provider.

Finally, as shown by block 406, method 400 involves the base station responding to the determination by: (i) allocating to the first subset of the UEs uplink air interface resources from a first portion of the wireless carrier band, and (ii) allocating to the second subset of the UEs uplink air interface resources from a second portion of the wireless carrier band. In accordance with example embodiments, attenuation of uplink transmission power for the first portion of the wireless carrier band is specified by a first amount, and attenuation of uplink transmission power for the second portion of the wireless carrier band is specified by a second amount. And in particular, the first amount is smaller than the second amount.

In accordance with example embodiments, the base station broadcasting the message instructing the UEs to attenuate their respective uplink transmission powers can entail the base station broadcasting the message in response to the base station allowing inbound roaming of at least one UE that the base station cannot verify to be compliant with one or more rules governing uplink transmission power levels. More generally, the base station can broadcast the message in response to operating under conditions in which the base station cannot verify one or more UEs it is serving to be compliant with the one or more rules governing uplink transmission power levels.

Also accordance with example embodiments, the wireless carrier band can configured between a minimum frequency and a maximum frequency, such that there is a lower wireless carrier band adjacent to and below the minimum frequency and/or a higher wireless carrier band adjacent to and above the maximum frequency. With this configuration, the base station broadcasting the message instructing the UEs to attenuate their respective uplink transmission powers can correspond to the base station directing the UEs to use respective uplink power levels configured to prevent cross-carrier emission leakage. In particular, the respective uplink power levels may be configured to prevent more than a threshold amount of power leakage into the lower wireless carrier band and/or the higher wireless carrier band.

In further accordance with example embodiments, causing the UEs to use respective uplink power levels configured to prevent cross-carrier emission leakage in this manner can be achieved by the base station using the particular allocation scheme for uplink air interface resources. Specifically, allocating uplink air interface resources from the first portion of the wireless carrier band to the first subset of the UEs and allocating uplink air interface resources from the second portion of the wireless carrier band to the second subset of the UEs corresponds allocating uplink air interface resources that are more widely separated in frequency from both the minimum frequency and the maximum frequency to the first subset of the UEs than the uplink air interface resources allocated to the second subset of UEs. By making allocations in this manner, the base station can enable the first subset of UEs to attenuate their respective uplink transmission power levels less than those of the second subset, and to do so without leaking more than a threshold amount of power into the lower wireless carrier band and/or the higher wireless carrier band. At the same time, each of the second subset of UEs can be caused to respectively determine that it is required to apply the second amount of attenuation to its uplink transmission power level. This second amount of attenuation serves to prevent leaking more than a threshold amount of power into at least one of the lower wireless carrier band or the higher wireless carrier band.

In accordance with example embodiments, the base station can make the determination that the wireless communication network of the first service provider is the home network of the first subset of the UEs, and that the second subset of the UEs are roaming in the wireless communication network can entail the base station receiving from each respective UE a transmission including information indicative of the home network of the respective UE. The base station can then determine that the wireless communication network of the first service provider is the home network for each of the first subset of UEs identified, and conversely determine that the wireless communication network of the first service provider is not the home network for any of the second subset of UEs identified. In particular, the information indicative of a home network of the respective UE can identify the respective UE as a subscriber of the first service provider.

It will be appreciated that the example method 400 could each include alternate and/or additional steps, while still remaining within the scope and spirit of example embodiments herein.

Figure 5:
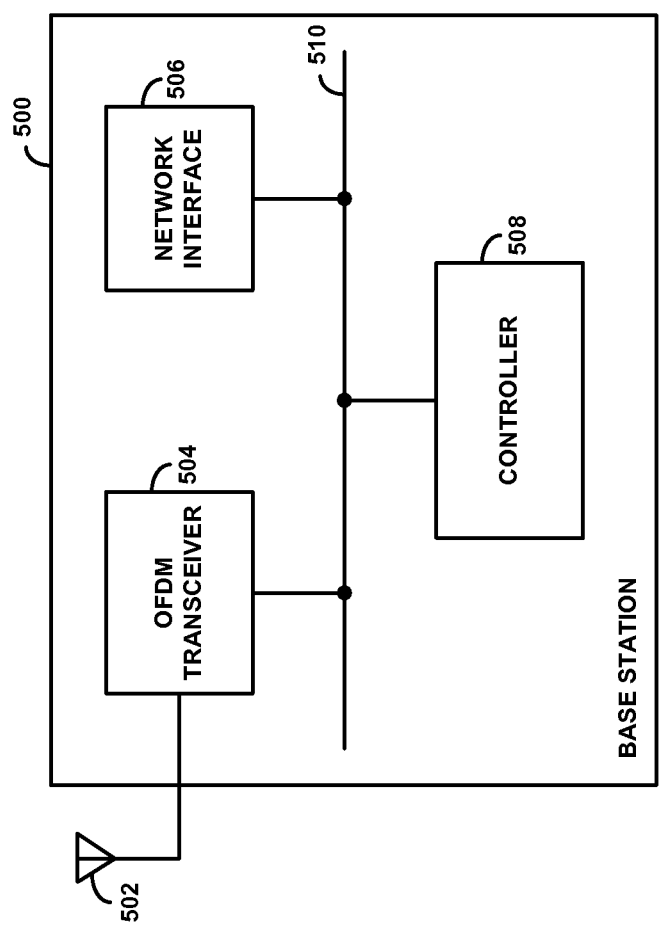
FIG. 5 is a simplified block diagram of an example cellular base station, in accordance with an example embodiment.
Figure 6:
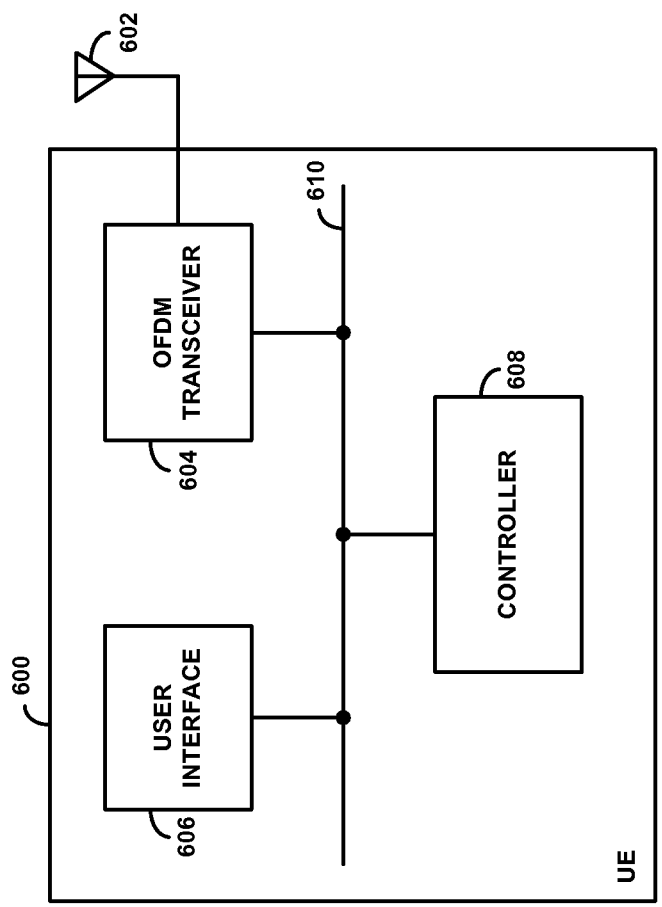
FIG. 6 is a simplified block diagram of an example UE, in accordance with an example embodiment.

Example embodiments of a base station and a UE are shown in FIGS. 5 and 6. More particularly, FIG. 5 is a simplified block diagram of an example cellular base station 500, such as the eNodeB 112 in FIG. 1, showing some of the components of such a base station to facilitate implementation of the present method. As shown in FIG. 5, the example base station 500 includes an OFDM transceiver 504 and an associated antenna structure 503, as well as a network interface 506, and a controller 508, with various ones of these or other components being communicatively linked together by a system bus, network, or other connection mechanism 510.

The OFDM transceiver 504 and antenna structure 502 may function in combination to provide an OFDMA air interface as described above. As such, the OFDM transceiver 504 is configured to receive data, generate OFDM symbols from the data, and transmit the OFDM symbols on the air interface, and to define on the air interface various channels such as a PDCCH and PDSCH as discussed above. Network interface 506 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more UEs served by the base station.

The controller 508, which may be integrated with OFDM transceiver 504 or one or more other components, may then control the transmission of data, including control and user data, on the downlink air interface. For example, the controller 506 may allocate uplink resource blocks to UEs and generate corresponding DCI messages, and the controller 508 may control transmission by the OFDM transceiver 504 accordingly. Further, the controller 508 may cause the OFDM transceiver 504 to transmit to a UE a network signal indicating that the UE should apply additional attenuation on its uplink transmissions.

The controller 508 could be implemented using hardware, software, and/or firmware. For example, controller 508 could include one or more processors and a non-transitory computer readable medium (e.g., volatile and/or non-volatile memory) that stores executable instructions. The executable instructions, when executed by the one or more processors, may cause the controller 508 to perform any of the base station functions described herein.

Finally, FIG. 6 is a simplified block diagram of an example UE 600, such as the UE 116 in FIG. 1, showing some of the components of such a UE to facilitate implementation of the present method. As shown in FIG. 6, the example UE 600 includes a user interface 606, an OFDM transceiver 604 and an associated antenna structure 602, and a controller 608, with various ones of these or other components being communicatively linked together by a system bus, network, or other connection mechanism 610.

The user interface 606 may include input and output components to facilitate interaction with a user if the UE is a user-operable device. The OFDM transceiver 604 and antenna structure 602 may then function in combination to engage in OFDMA air interface communication with a cellular base station such as that described above. As such, the OFDM transceiver 604 may be configured to receive OFDM communications on an air interface as described above, including for instance PDCCH communications and PDSCH communications, and to transmit OFDM communications, including for instance PUCCH communications and PUSCH communications, also as described above. And the controller 608, which may be integrated with the OFDM transceiver 604 or one or more other components, may control the processing of received communications, including control and user data.

Exemplary embodiments have been described above. Those skilled in the art will understand, however, that changes and modifications may be made to these embodiments without departing from the true scope and spirit of the invention.

We claim:

1. A method operable in a base station of a wireless communication network of a first service provider, wherein the base station is configured for providing wireless services to user equipment devices (UEs) using air interface resources that span a wireless carrier band, the method comprising:

the base station broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions;

making a determination, by the base station, that the wireless communication network of the first service provider is a home network of a first subset of the UEs, and that a second subset of the UEs are roaming in the wireless communication network of the first service provider from a wireless communication network of at least one different service provider; and in response to at least the determination, the base station (i) allocating to the first subset of the UEs uplink air interface resources from a first portion of the wireless carrier band for which attenuation of uplink transmission power is specified by a first amount, and (ii) allocating to the second subset of the UEs uplink air interface resources from a second portion of the wireless carrier band for which attenuation of uplink transmission power is specified by a second amount, wherein the first amount is smaller than the second amount.

2. The method of claim 1, wherein the base station broadcasting to the UEs in the coverage area of the base station the message instructing the UEs to attenuate their respective uplink transmission powers comprises the base station broadcasting the message in response to the base station allowing inbound roaming of at least one UE that the base station cannot verify to be compliant with one or more rules governing uplink transmission power levels.

3. The method of claim 1, wherein the wireless carrier band is configured between a minimum frequency and a maximum frequency,
    wherein there exists at least one of (i) a lower wireless carrier band adjacent to and below the minimum frequency or (ii) a higher wireless carrier band adjacent to and above the maximum frequency,
    and wherein the base station broadcasting to the UEs in the coverage area of the base station the message instructing the UEs to attenuate their respective uplink transmission powers comprises the base station directing the UEs to use respective uplink power levels configured to prevent uplink transmissions from leaking more than a threshold amount of power into at least one of the lower wireless carrier band or the higher wireless carrier band.

4. The method of claim 1, wherein the wireless carrier band is configured between a minimum frequency and a maximum frequency,
    wherein there exists at least one of (i) a lower wireless carrier band adjacent to and below the minimum frequency or (ii) a higher wireless carrier band adjacent to and above the maximum frequency,
    wherein the second portion of the wireless carrier band includes two segments that flank the first portion of the wireless carrier band such that the first portion of the wireless carrier band is separated from both the minimum frequency and the maximum frequency by at least the two segments,
    and wherein the base station (i) allocating to the first subset of the UEs uplink air interface resources from the first portion of the wireless carrier band, and (ii) allocating to the second subset of the UEs uplink air interface resources from the second portion of the wireless carrier band comprises:
    allocating to the first subset of the UEs uplink air interface resources that are more widely separated in frequency from both the minimum frequency and the maximum frequency than the uplink air interface resources allocated to the second subset of UEs.

5. The method of claim 4, wherein allocating to the first subset of the UEs uplink air interface resources that are more widely separated in frequency from both the minimum frequency and the maximum frequency than the uplink air interface resources allocated to the second subset of UEs comprises:
    enabling the first subset of UEs to attenuate their respective uplink transmission power levels less than those of the second subset, without transmissions of the first subset of UEs leaking more than a threshold amount of power into at least one of the lower wireless carrier band or the higher wireless carrier band.

6. The method of claim 4, wherein allocating to the first subset of the UEs uplink air interface resources that are more widely separated in frequency from both the minimum frequency and the maximum frequency than the uplink air interface resources allocated to the second subset of UEs comprises:
    causing each of the second subset of UEs to respectively determine that it is required to apply the second amount of attenuation to its uplink transmission power level, the requirement serving to prevent leaking more than a threshold amount of power into at least one of the lower wireless carrier band or the higher wireless carrier band.

7. The method of claim 1, wherein making the determination by the base station comprises:
    receiving from each respective UE of the UEs a transmission including information indicative of a home network of the respective UE;
    determining from the transmissions that the wireless communication network of the first service provider is the home network for each of the first subset of UEs identified; and
    determining from the transmissions that the wireless communication network of the first service provider is not the home network for any of the second subset of UEs identified.

8. The method of claim 7, wherein the information indicative of a home network of the respective UE identifies the respective UE as a subscriber of the first service provider.

9. A base station operable in a wireless communication network of a first service provider, wherein the base station is configured for providing wireless services to user equipment devices (UEs) using air interface resources that span a wireless carrier band, the base station comprising:
    a communicative link with at transceiver;
    one or more processors; and
    memory accessible to the one or more processors, and storing machine language instructions that, upon execution by the one or more processors, cause the base station to carry out operations including:
    broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions,
    making a determination that the wireless communication network of the first service provider is a home network of a first subset of the UEs, and that a second subset of the UEs are roaming in the wireless communication network of the first service provider from a wireless communication network of at least one different service provider, and
    in response to at least the determination, (i) allocating to the first subset of the UEs uplink air interface resources from a first portion of the wireless carrier band for which attenuation of uplink transmission power is specified by a first amount, and (ii) allocating to the second subset of the UEs uplink air interface resources from a second portion of the wireless carrier band for which attenuation of uplink transmission power is specified by a second amount, wherein the first amount is smaller than the second amount.

10. The base station of claim 9, wherein broadcasting to the UEs in the coverage area of the base station the message instructing the UEs to attenuate their respective uplink transmission powers comprises broadcasting the message in response to the base station allowing inbound roaming of at least one UE that the base station cannot verify to be compliant with one or more rules governing uplink transmission power levels.

11. The base station of claim 9, wherein the wireless carrier band is configured between a minimum frequency and a maximum frequency, wherein there exists at least one of (i) a lower wireless carrier band adjacent to and below the minimum frequency or (ii) a higher wireless carrier band adjacent to and above the maximum frequency, and wherein broadcasting to the UEs in the coverage area of the base station the message instructing the UEs to attenuate their respective uplink transmission powers comprises directing the UEs to use respective uplink power levels configured to prevent uplink transmissions from leaking more than a threshold amount of power into at least one of the lower wireless carrier band or the higher wireless carrier band.

12. The base station of claim 9, wherein the wireless carrier band is configured between a minimum frequency and a maximum frequency, wherein there exists at least one of (i) a lower wireless carrier band adjacent to and below the minimum frequency or (ii) a higher wireless carrier band adjacent to and above the maximum frequency, wherein the second portion of the wireless carrier band includes two segments that flank the first portion of the wireless carrier band such that the first portion of the wireless carrier band is separated from both the minimum frequency and the maximum frequency by at least the two segments, and wherein the base station (i) allocating to the first subset of the UEs uplink air interface resources from the first portion of the wireless carrier band, and (ii) allocating to the second subset of the UEs uplink air interface resources from the second portion of the wireless carrier band comprises:

allocating to the first subset of the UEs uplink air interface resources that are more widely separated in frequency from both the minimum frequency and the maximum frequency than the uplink air interface resources allocated to the second subset of UEs.

13. The base station of claim 12, wherein allocating to the first subset of the UEs uplink air interface resources that are more widely separated in frequency from both the minimum frequency and the maximum frequency than the uplink air interface resources allocated to the second subset of UEs comprises:

enabling the first subset of UEs to attenuate their respective uplink transmission power levels less than those of the second subset, without transmissions of the first subset of UEs leaking more than a threshold amount of power into at least one of the lower wireless carrier band or the higher wireless carrier band; and causing each of the second subset of UEs to respectively determine that it is required to apply the second amount of attenuation to its uplink transmission power level, wherein the requirement serves to prevent leaking more than a threshold amount of power into at least one of the lower wireless carrier band or the higher wireless carrier band.

14. The base station of claim 9, wherein making the determination comprises:

receiving from each respective UE of the UEs a transmission including information indicative of a home network of the respective UE;

determining from the transmissions that the wireless communication network of the first service provider is the home network for each of the first subset of UEs identified; and determining from the transmissions that the wireless communication network of the first service provider is not the home network for any of the second subset of UEs identified.

15. A non-transitory computer readable medium having stored thereon instructions that, upon executing by one or more processors of a base station, cause the base station to carry out operations, wherein the base station is operable in a wireless communication network of a first service provider, and the base station is configured for providing wireless services to user equipment devices (UEs) using air interface resources that span a wireless carrier band, wherein the operations comprise:

broadcasting to UEs in a coverage area of the base station a message instructing the UEs to attenuate their respective uplink transmission powers by a respective amount to be determined by each respective UE of the UEs based on which of multiple portions of the wireless carrier band is allocated, at least in part, to the respective UE by the base station for uplink transmissions;

making a determination that the wireless communication network of the first service provider is a home network of a first subset of the UEs, and that a second subset of the UEs are roaming in the wireless communication network of the first service provider from a wireless communication network of at least one different service provider; and in response to at least the determination, (i) allocating to the first subset of the UEs uplink air interface resources from a first portion of the wireless carrier band for which attenuation of uplink transmission power is specified by a first amount, and (ii) allocating to the second subset of the UEs uplink of interface resources from a second portion of the wireless carrier band for which attenuation of uplink transmission power is specified by a second amount, wherein the first amount is smaller than the second amount.

16. The non-transitory computer readable medium of claim 15, wherein broadcasting to the UEs in the coverage area of the base station the message instructing the UEs to attenuate their respective uplink transmission powers comprises broadcasting the message in response to the base station allowing inbound roaming of at least one UE that the base station cannot verify to be compliant with one or more rules governing uplink transmission power levels.

17. The non-transitory computer readable medium of claim 15, wherein the wireless carrier band is configured between a minimum frequency and a maximum frequency, wherein there exists at least one of (i) a lower wireless carrier band adjacent to and below the minimum frequency or (ii) a higher wireless carrier band adjacent to and above the maximum frequency, and wherein broadcasting to the UEs in the coverage area of the base station the message instructing the UEs to attenuate their respective uplink transmission powers comprises directing the UEs to use respective uplink power levels configured to prevent uplink transmissions from leaking more than a threshold amount of power into at least one of the lower wireless carrier band or the higher wireless carrier band.

18. The non-transitory computer readable medium of claim 15, wherein the wireless carrier band is configured between a minimum frequency and a maximum frequency, wherein there exists at least one of (i) a lower wireless carrier band adjacent to and below the minimum frequency or (ii) a higher wireless carrier band adjacent to and above the maximum frequency, wherein the second portion of the wireless carrier band includes two segments that flank the first portion of the wireless carrier band such that the first portion of the wireless carrier band is separated from both the minimum frequency and the maximum frequency by at least the two segments, and wherein the base station (i) allocating to the first subset of the UEs uplink air interface resources from the first portion of the wireless carrier band, and (ii) allocating to the second subset of the UEs uplink air interface resources from the second portion of the wireless carrier band comprises:

allocating to the first subset of the UEs uplink air interface resources that are more widely separated in frequency from both the minimum frequency and the maximum frequency than the uplink air interface resources allocated to the second subset of UEs.

19. The non-transitory computer readable medium of claim 18, wherein allocating to the first subset of the UEs uplink air interface resources that are more widely separated in frequency from both the minimum frequency and the maximum frequency than the uplink air interface resources allocated to the second subset of UEs comprises:

enabling the first subset of UEs to attenuate their respective uplink transmission power levels less than those of the second subset, without transmissions of the first subset of UEs leaking more than a threshold amount of power into at least one of the lower wireless carrier band or the higher wireless carrier band; and causing each of the second subset of UEs to respectively determine that it is required to apply the second amount of attenuation to its uplink transmission power level, wherein the requirement serves to prevent leaking more than a threshold amount of power into at least one of the lower wireless carrier band or the higher wireless carrier band.

20. The non-transitory computer readable medium of claim 15, wherein making the determination comprises:

receiving from each respective UE of the UEs a transmission including information indicative of a home network of the respective UE;

determining from the transmissions that the wireless communication network of the first service provider is the home network for each of the first subset of UEs identified; and determining from the transmissions that the wireless communication network of the first service provider is not the home network for any of the second subset of UEs identified.

\* \* \* \* \*